US012748418B2

(12) United States Patent
Zhang et al.

(10) Patent No.: US 12,748,418 B2
(45) Date of Patent: Sep. 29, 2026

(54) AUTOMATED REAL-TIME DETECTION, PREDICTION AND PREVENTION OF RARE FAILURES IN INDUSTRIAL SYSTEM WITH UNLABELED SENSOR DATA

(71) Applicant: HITACHI VANTARA LLC, Santa Clara, CA (US)

(72) Inventors: Yongqiang Zhang, Lexington, MA (US); Wei Lin, Plainsboro, NJ (US); William Schmarzo, Palo Alto, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 557 days.

(21) Appl. No.: 18/029,949

(22) PCT Filed: Oct. 30, 2020

(86) PCT No.: PCT/US2020/058311

§ 371 (c)(1),
(2) Date: Apr. 3, 2023

(87) PCT Pub. No.: WO2022/093271

PCT Pub. Date: May 5, 2022

(65) Prior Publication Data

US 2023/0376026 A1 Nov. 23, 2023

(51) Int. Cl.
*G05B 23/02* (2006.01)

(52) U.S. Cl.
CPC ..... *G05B 23/0281* (2013.01); *G05B 23/0248* (2013.01); *G05B 23/027* (2013.01); *G05B 23/0283* (2013.01)

(58) Field of Classification Search
CPC ............ G05B 23/0281; G05B 23/0248; G05B 23/027; G05B 23/0283; G06N 3/0455; G06N 3/0442; G06N 5/01; G06N 20/20; G06N 3/088; G06N 7/01; G06N 20/00; G06N 3/044; G06N 3/045; G06N 3/084;
(Continued)

(56) References Cited

U.S. PATENT DOCUMENTS 10,572,823 B1 2/2020 Feinman et al.
11,455,206 B2 * 9/2022 Ganesan ............. G06F 11/0793
(Continued)

OTHER PUBLICATIONS

International Search Report and Written Opinion dated Mar. 22, 2021 in International Application No. PCT/US2020/058311.

*Primary Examiner* — Mohammad K Islam
(74) *Attorney, Agent, or Firm* — PROCOPIO, CORY, HARGREAVES & SAVITCH LLP

(57) ABSTRACT

Example implementations described herein are directed to management of a system comprising a plurality of apparatuses providing unlabeled sensor data, which can involve executing feature extraction on the unlabeled sensor data to generate a plurality of features; executing failure detection by processing the plurality of features with a failure detection model to generate failure detection labels, the failure detection model generated from a machine learning framework that applies supervised machine learning on unsupervised machine learning models generated from unsupervised machine learning; and providing extracted features and the failure detection label to a failure prediction model to generate failure prediction and a sequence of features.

17 Claims, 11 Drawing Sheets

(58) Field of Classification Search
CPC ...... G06N 3/0464; G06N 10/00; G06N 20/10; G06N 3/042; G06N 3/047; G06N 3/048; G06N 3/08; G06N 3/082; G06N 3/0895
See application file for complete search history.

(56) References Cited

U.S. PATENT DOCUMENTS

| | | | | |
|---|---|---|---|---|
| 11,567,460 | B2 * | 1/2023 | Carullo | G05B 23/0243 |
| 12,340,550 | B2 * | 6/2025 | Cortes | G06V 10/82 |
| 2005/0131869 | A1 * | 6/2005 | Xie | G06V 20/40 |
| 2017/0032281 | A1 | 2/2017 | Hsu | |
| 2018/0096261 | A1 * | 4/2018 | Chu | G06N 20/20 |
| 2019/0163165 | A1 | 5/2019 | Gotou et al. | |
| 2019/0280942 | A1 * | 9/2019 | Côté | H04L 41/147 |
| 2019/0324430 | A1 | 10/2019 | Herzog et al. | |
| 2019/0325328 | A1 * | 10/2019 | Katz | G06N 7/01 |
| 2020/0076841 | A1 | 3/2020 | Hajimirsadeghi et al. | |
| 2020/0104200 | A1 * | 4/2020 | Kocberber | G06F 11/2263 |
| 2020/0125961 | A1 | 4/2020 | Agrawal et al. | |
| 2020/0210854 | A1 * | 7/2020 | Srinivasan | G06N 5/02 |
| 2020/0251360 | A1 * | 8/2020 | Liao | G05B 23/024 |
| 2022/0004935 | A1 * | 1/2022 | Lakshmanan | G06N 7/01 |
| 2022/0058527 | A1 * | 2/2022 | Lavid Ben Lulu | G05B 23/024 |
| 2022/0269258 | A1 * | 8/2022 | Yang | G05B 23/0281 |

* cited by examiner

AUTOMATED REAL-TIME DETECTION, PREDICTION AND PREVENTION OF RARE FAILURES IN INDUSTRIAL SYSTEM WITH UNLABELED SENSOR DATA

BACKGROUND

Field

The present disclosure relates generally to industrial systems, and more specifically, to automated real-time detection, prediction, and prevention of rare failures in an industrial system with unlabeled sensor data.

Related Art

The industrial systems described herein include most industries that operate complex systems, including but not limited to the manufacturing industry, theme parks, hospitals, airports, utilities, mining, oil & gas, warehouse, and transportation systems.

The two major failure categories are defined by how distant the failure is in terms of the time of the failure from its symptoms. Fast types of failures involve symptoms and failures that are close in terms of time, such as the overloading failures on conveyor belts. Slow (or Chronic) types of failures involve symptoms that are long past (or much earlier than) the failures. This type of failure usually has wider negative impact and may shut down the whole system. Such types of failures can involve the fracture and crack on a dam, or a break due to metal fatigue.

Failures in complex systems are rare, but the cost of such failures can be massive in terms of financial costs (e.g., operational, maintenance, repair, logistics, etc.), reputation costs (e.g., marketing, market share, sale, quality, etc.), human costs (e.g., scheduling, skill set, etc.) and liability costs (e.g., safety, health, etc.).

SUMMARY

Example implementations described herein are directed to the fast type of failures, in which failures happen in a short time window after the symptoms. The short time window can range from several minutes to several hours, depending on the actual problems in a specific industrial system.

Several problems (limitations and restrictions) of related art systems and methods are discussed below. Example implementations described herein introduces techniques to solve these problems.

In the related art implementation involving unsupervised learning tasks, data science practitioners usually need to build one model each time, manually check the results, and evaluate the model based on the results. Model-based feature selection is not available to related art unsupervised learning tasks. Further, data science practitioners usually need to manually explain the results. The manual work involved in the unsupervised learning tasks are usually time consuming, prone to errors, and subjective. There is a need to provide generic techniques to automate the model evaluation, feature selection, and explainable Artificial Intelligence (AI) for unsupervised learning tasks.

Related art implementations rely heavily on the accurate historical failure data. However, severe historical failures are rare and accurate historical failure data is usually not available for several reasons. For example, historical failures may not be collected, as there may be no process or a limited process set up to collect failure data, and may also be infeasible for manual processing, detection, and identification of failure data due to a large volume of Internet of Things (IoT) data. Further, the collected historical failures may not be accurate as there is no standard process to effectively and efficiently detect and classify both common and rare events. Further, the manual process to collect failures by labeling the sensor data based on the domain knowledge is inaccurate, inconsistent, unreliable, and time consuming. Therefore, there is a need an automated and standard process or approach to detect and collect failures accurately, effectively, and efficiently in the industrial systems.

Related art failure prediction solutions do not perform well for the rare failure events with the required response time (or lead time). Reasons include the inability to determine the optimal windows to collect features/evidence and failures, or inability to identify the correct signals that can predict failures. Besides, because an industrial system usually runs in a normal state and failures are usually rare events, it can be difficult to capture the patterns of the limited amounts of the failures and thus hard to predict such failures. Further, related art implementations may be unable to build the correct relationship between normal cases and rare failure events in the temporal order, and may be unable to capture the sequence pattern of the progression of rare failures. Therefore, there is a need for an approach which can identify the correct signals for failure prediction within optimal feature windows given the limited amount of failure data in the optimal failure window and the required response time, so that correct relationships can be built between normal cases and rare failures, and the progression of rare failures.

In related art implementations, the prevention of failures is usually done manually based on domain knowledge, which is subjective, time consuming, and prone to errors. Therefore, there is a need for a standard approach to identify the root cause of the predicted failures, automate the failure remediation recommendation by incorporating the domain knowledge, and optimize the alert suppression in order to reduce alert fatigue.

Because of the massive negative impacts of failures in industrial systems, the solutions proposed herein aim to detect, predict, and prevent such failures in order to mitigate or avoid the negative impacts. From the failure prevention solutions described herein, example implementations can reduce unplanned downtime and operating delays while increasing productivity, output, and operational effectiveness, optimize yields and increase margins/profits, maintain consistency of production and product quality, reduce unplanned cost for logistics, scheduling maintenance, labor, and repair costs, reduce damage to the assets and the whole industrial system, and reduce accidents to operators and improve the health and safety of the operators. The proposed solutions generally provide benefits to operators, supervisors/managers, maintenance technicians, SME/domain experts, and so on.

Aspects of the present disclosure can involve a method for a system having a plurality of apparatuses providing unlabeled sensor data, the method involving executing feature extraction on the unlabeled sensor data to generate a plurality of features; executing failure detection by processing the plurality of features with a failure detection model to generate failure detection labels, the failure detection model generated from a machine learning framework that applies supervised machine learning on unsupervised machine learning models generated from unsupervised machine learning; and providing extracted features and the failure detection label to a failure prediction model to generate failure prediction and a sequence of features.

Aspects of the present disclosure can involve a computer program, storing instructions for management of a system having a plurality of apparatuses providing unlabeled sensor data, the instructions including executing feature extraction on the unlabeled sensor data to generate a plurality of features; executing failure detection by processing the plurality of features with a failure detection model to generate failure detection labels, the failure detection model generated from a machine learning framework that applies supervised machine learning on unsupervised machine learning models generated from unsupervised machine learning; and providing extracted features and the failure detection label to a failure prediction model to generate failure prediction and a sequence of features. The computer program may be stored on a non-transitory computer readable medium and executed by one or more processors.

Aspects of the present disclosure can involve a system having a plurality of apparatuses providing unlabeled sensor data, the system including means for executing feature extraction on the unlabeled sensor data to generate a plurality of features; means for executing failure detection by processing the plurality of features with a failure detection model to generate failure detection labels, the failure detection model generated from a machine learning framework that applies supervised machine learning on unsupervised machine learning models generated from unsupervised machine learning; and means for providing extracted features and the failure detection label to a failure prediction model to generate failure prediction and a sequence of features.

Aspects of the present disclosure can involve a management apparatus for system having a plurality of apparatuses providing unlabeled sensor data, the management apparatus including a processor, configured to execute feature extraction on the unlabeled sensor data to generate a plurality of features; execute failure detection by processing the plurality of features with a failure detection model to generate failure detection labels, the failure detection model generated from a machine learning framework that applies supervised machine learning on unsupervised machine learning models generated from unsupervised machine learning; and extract features and the failure detection label to a failure prediction model to generate failure prediction and a sequence of features.

Aspects of the present disclosure can include a method for a system having a plurality of apparatuses providing unlabeled data, the method including executing feature extraction on the unlabeled data to generate a plurality of features; executing a machine learning framework that transforms unsupervised learning tasks into supervised learning tasks through applying supervised machine learning on unsupervised machine learning models generated from unsupervised machine learning, the executing the machine learning framework involving executing the unsupervised machine learning to generate the unsupervised machine learning models based on the features; executing supervised machine learning on results from each of the unsupervised machine learning models to generate supervised ensembled machine learning models, each of the supervised ensemble machine learning models corresponding to each of the unsupervised machine learning models; selecting ones of the unsupervised machine learning models based on an evaluation of the results of the unsupervised machine learning models against predictions generated by the supervised ensemble machine learning models; selecting features based on the evaluation results of the unsupervised learning models; and converting the selected ones of unsupervised learning models to supervised learning models for facilitating explainable artificial intelligence (AI).

Aspects of the present disclosure can include a computer program for a system having a plurality of apparatuses providing unlabeled data, the computer program having instructions including executing feature extraction on the unlabeled data to generate a plurality of features; executing a machine learning framework that transforms unsupervised learning tasks into supervised learning tasks through applying supervised machine learning on unsupervised machine learning models generated from unsupervised machine learning, the executing the machine learning framework involving executing the unsupervised machine learning to generate the unsupervised machine learning models based on the features; executing supervised machine learning on results from each of the unsupervised machine learning models to generate supervised ensembled machine learning models, each of the supervised ensemble machine learning models corresponding to each of the unsupervised machine learning models; selecting ones of the unsupervised machine learning models based on an evaluation of the results of the unsupervised machine learning models against predictions generated by the supervised ensemble machine learning models; selecting features based on the evaluation results of the unsupervised learning models; and converting the selected ones of unsupervised learning models to supervised learning models for facilitating explainable artificial intelligence (AI). The computer program may be stored on a non-transitory computer readable medium and executed by one or more processors.

Aspects of the present disclosure can include a system having a plurality of apparatuses providing unlabeled data, the system including means for executing feature extraction on the unlabeled data to generate a plurality of features; means for executing a machine learning framework that transforms unsupervised learning tasks into supervised learning tasks through applying supervised machine learning on unsupervised machine learning models generated from unsupervised machine learning, the executing the machine learning framework involving executing the unsupervised machine learning to generate the unsupervised machine learning models based on the features; means for executing supervised machine learning on results from each of the unsupervised machine learning models to generate supervised ensembled machine learning models, each of the supervised ensemble machine learning models corresponding to each of the unsupervised machine learning models; means for selecting ones of the unsupervised machine learning models based on an evaluation of the results of the unsupervised machine learning models against predictions generated by the supervised ensemble machine learning models; means for selecting features based on the evaluation results of the unsupervised learning models; and means for converting the selected ones of unsupervised learning models to supervised learning models for facilitating explainable artificial intelligence (AI).

Aspects of the present disclosure can include a management apparatus for a system having a plurality of apparatuses providing unlabeled data, the management apparatus including a processor configured to execute feature extraction on the unlabeled data to generate a plurality of features; execute a machine learning framework that transforms unsupervised learning tasks into supervised learning tasks through applying supervised machine learning on unsupervised machine learning models generated from unsupervised machine learning, the executing the machine learning framework involving executing the unsupervised machine learning to generate the unsupervised machine learning models based on the features; execute supervised machine learning on results from each of the unsupervised machine learning models to generate supervised ensembled machine learning models, each of the supervised ensemble machine learning models corresponding to each of the unsupervised machine learning models; select ones of the unsupervised machine learning models based on an evaluation of the results of the unsupervised machine learning models against predictions generated by the supervised ensemble machine learning models; select features based on the evaluation results of the unsupervised learning models; and convert the selected ones of unsupervised learning models to supervised learning models for facilitating explainable artificial intelligence (AI).

BRIEF DESCRIPTION OF DRAWINGS

FIG. 7(*b*) illustrates an example flow diagram if there is an alert with the same asset and failure mode, in accordance with an example implementation.

FIG. 7(*c*) illustrates an example flow diagram if there is no alert with the same asset and failure mode, in accordance with an example implementation.

DETAILED DESCRIPTION

Figure 1:
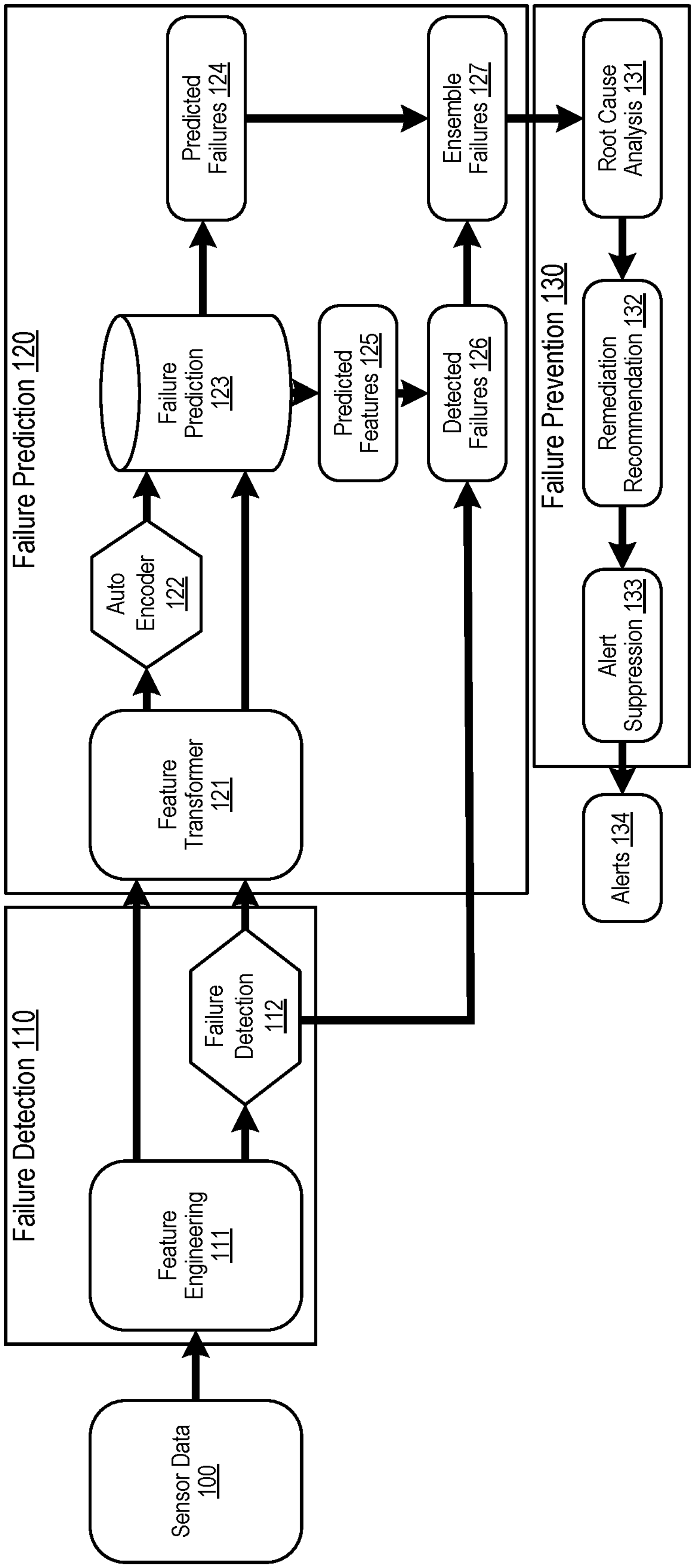
FIG. 1 illustrates a solution architecture for detection, prediction, and prevention of rare failures in the industrial systems, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

To address the issues of the related art, example implementations involve several techniques as follows.

Solve unsupervised learning tasks with supervised learning techniques: Example implementations involve generic techniques to automate the model evaluation, feature selection, and explainable AI, which are usually available in supervised learning models, to solve unsupervised learning tasks.

Failure detection: Example implementations automate the manual process to detect failures accurately, efficiently, and effectively with anomaly detection models; leverage the introduced generic framework and solution architecture to apply supervised learning techniques (feature selection, model selection and explainable AI) to optimize and explain the anomaly detection models.

Failure prediction: Example implementations introduce techniques to derive signals/features within optimal feature windows and to predict rare failures within the optimal failure windows given the required response time by using both derived features and historical failures.

Failure prevention: Example implementations introduce techniques to identify the root cause of the predicted failures, automate the failure remediation recommendation by incorporating the domain knowledge, and suppress alerts with an optimized, data-driven approach.

FIG. 1 illustrates a solution architecture for detection, prediction, and prevention of rare failures in the industrial systems, in accordance with an example implementation.

Sensor Data 100: Time series data from multiple sensors are collected and will be the input in this solution. The time series data is unlabeled, meaning that no manual process is required to label or tag the sensor data to indicate whether each data point corresponds to a failure or not.

Failure Detection 110 involves the following components configured to detect failures based on the input sensor data. Feature Engineering 111 is used to derive features/signals which will be used to build failure detection and failure prediction models. This component involves three subcomponents: sensor selection, feature extraction, and feature selection. Failure Detection 112 is configured to utilize an anomaly detection technique to detect rare failures in the industrial systems. The detected rare failures are used as a target to build a failure prediction model. The detected historical rare failures are also used to form features to build a failure prediction model.

Failure Prediction 120 involves the following components configured to predict failures with the features and detected failures. Feature Transformer 121 transforms the features from the feature engineering module and detected failures into a format that can be consumed by the Long Short Term Memory (LSTM) Auto Encoder and LSTM Failure Prediction module. Auto encoder 122 is used to encode the derived features from the Feature Engineering component 111 and the detected rare failures to remove the redundant information in the time series data. The encoded features keep the signals in the time series data and will be used to build failure prediction models. Failure Prediction module 123 involves a deep Recurrent Neural Network (RNN) model with an LSTM network architecture, which is used to build the failure prediction model with the encoded features (as features), original features (as target), and detected failures (as target). Predicted Failures 124 is one output of the failure prediction module 123, which is represented as a score to indicate the likelihood to be a failure. Predicted Features 125 is another output of the failure prediction module 123, which is a set of features that has the same format as the output of the Feature Engineering module 111. Detected Failures 126 is the output by applying the failure detection model to Predicted Features 125 and generating detected failure scores. Ensemble Failures 127 ensembles the output of the Predicted Failures 124 and Detected Failures 126 to form a single failure score. Different ensemble techniques can be used. For example, the average value of Predicted Failures 125 and Detected Failures 126 can be used as a single failure score.

Failure Prevention 130 involves the following components configured to identify root causes, automate the remediation recommendations, and suppress the alerts. Root Cause Analysis 131 is performed to automatically determine the root cause of the predicted failures. Remediation Recommendation 132 is configured to automatically generate remediation actions against the predicted failures by incorporation of the domain knowledge. In example implementations, an alert is generated to notify the operators so that they can remediate or avoid the failures based on the root causes of the failures. Alert suppression 133 is configured to suppress alerts to avoid flooding the alert queue of the operator, which is done through an automated data-driven optimization technique. Alerts 134 are the final output of the solution, which include predicted failure scores, root causes, and remediation recommendations.

In the following, each component in the solution architecture is discussed in detail. First, a generic framework and solution architecture is described to solve unsupervised learning tasks by using supervised learning techniques. This framework forms the foundation for the whole solution.

As described herein, a generic framework and solution architecture to solve unsupervised learning tasks by using supervised learning techniques is described. Unsupervised learning tasks mean that the data does not include target or label information. Unsupervised learning tasks can include clustering, anomaly detection, and so on. The supervised learning techniques include model selection through hyperparameter optimization, feature selection, and explainable AI.

Figure 2:
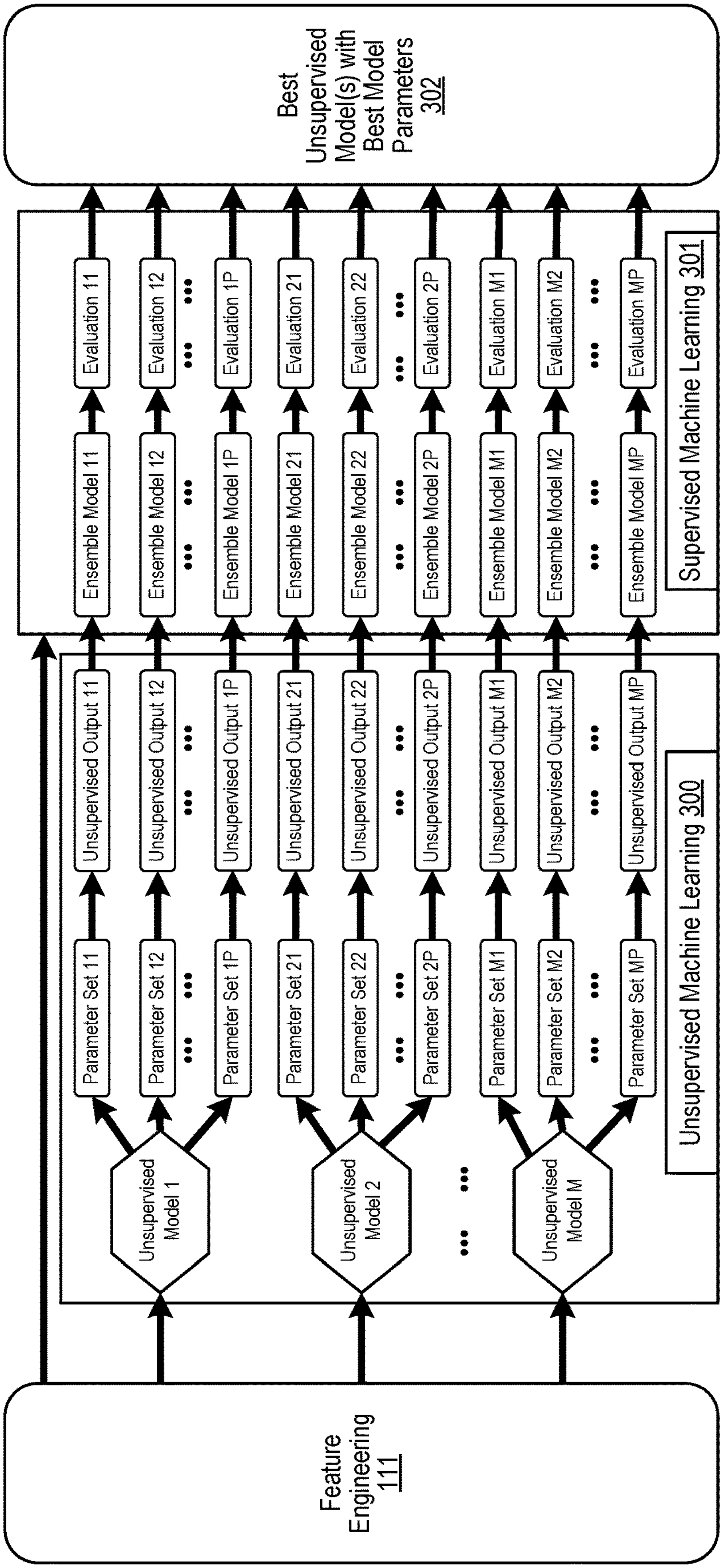
FIG. 2 illustrates an example workflow for model selection, in accordance with an example implementation.

FIG. 2 illustrates an example workflow for model selection, in accordance with an example implementation. The solution architecture for applying model selection techniques of supervised learning to select the best unsupervised learning model(s), how the ensemble model works, and lastly the rationale behind this solution architecture are described with respect to FIG. 2.

At first, given a dataset and an unsupervised teaming problem, example implementations find the best unsupervised learning model for the given problem and dataset. The first step is to derive features from the given dataset which is done through the Feature Engineering module 111.

Next, several unsupervised learning model algorithms are manually chosen and several parameter sets for each model algorithm are manually chosen as well as shown at 300. Each combination of model algorithm and parameter set will be used to build a model against the features derived from the feature engineering step as shown in FIG. 2. However, due to the nature of unsupervised learning tasks, there are no ground truth facts that can be used to measure how the model performs. Some unsupervised learning models, like clustering models, may have some metrics specific to clustering algorithms which can be used to measure the performance of the models. However, such metrics are not generic enough to be applied to all the unsupervised learning models.

Example implementations involve a generic solution to evaluate how the model performs by stacking supervised learning models 301 on top of unsupervised learning models. For each unsupervised learning model, the unsupervised learning model is applied to the features or data points to get the unsupervised results. Such unsupervised results can involve which cluster each data point belongs to for clustering problems, or whether the data point indicates an anomaly for an anomaly detection problem, and so on.

Such results and features will be the input for a supervised ensemble model, where features from the unsupervised teaming model will be used as features for supervised learning models; results from the unsupervised learning model will be used as the target for supervised learning models. The supervised ensembled models can be evaluated by comparing the target (results from the unsupervised learning model) and the predicted results from supervised ensemble models. Based on such evaluation results, which supervised ensemble model can produce the best evaluation results can thereby be identified.

Then, the example implementations can identify which unsupervised learning model corresponds to the best evaluation results at, and take that as the best unsupervised learning model with the best model parameter set, and output the model at 302.

Figure 3:
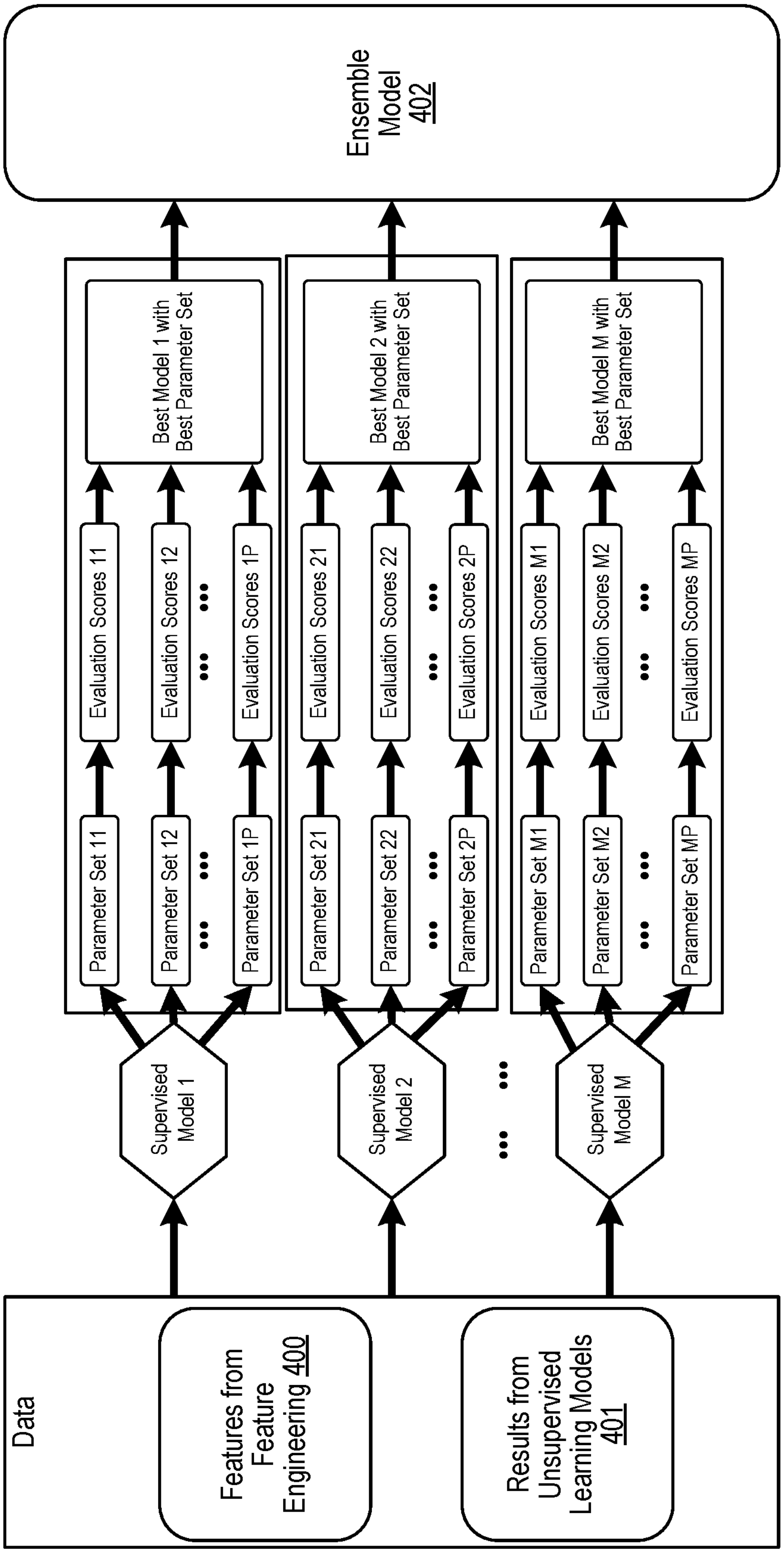
FIG. 3 illustrates an example implementation to train, select, and ensemble supervised learning models, in accordance with an example implementation.

FIG. 3 illustrates an example implementation of a solution architecture for ensembling supervised learning models. to train, select, and ensemble supervised learning models, in accordance with an example implementation. Each "Ensemble Model xx" in FIG. 2 is represented by FIG. 3.

At first, the example implementations train the models. Several supervised learning model algorithms are manually chosen and several parameter sets for each model algorithm are manually chosen as well.

Next, the example implementations select models with hyperparameter optimization. Several hyperparameter optimization techniques can be used, which include grid search, random search, Bayesian optimization, evolutional optimization, and reinforcement learning. For demonstration purposes, the grid search techniques are described with respect to FIG. 3. For each model algorithm, the process is as follows:

a. For each parameter set, a supervised learning model is built against the Features from Feature Engineering 400 and Results from Unsupervised Learning Model 401. The supervised learning model is evaluated against the predefined evaluation metrics and an evaluation score is associated with this model.
b. By comparing the evaluation scores from the model with different parameter sets, the best parameter set is selected for the current model algorithm.
c. Each model algorithm is associated with a parameter set which gives the best evaluation results.

The example implementations then form the ensemble models 402. The models from all the model algorithms are ensembled to form the final ensemble model 402. Ensemble is a process to combine or aggregate multiple individually trained models into one single model to make prediction for the unseen data. Ensemble techniques help reduce the generalization error of the prediction, assuming the base models are diverse and independent. In the example implementations, different ensemble techniques can be used as follows:

Classification models: The majority voting technique can be used to ensemble classification models. For each instance, apply each model to the current feature set and get the predicted classes. The class that appears most frequently will be used for the final prediction of the instance.

Regression models: There are several techniques for ensembling regression models.

Average for regression models: For each instance, apply each model to the current feature set and get the predicted value. Then, use the average of the predicted values from different models as the final prediction value.

Trimmed average for regression models: For each instance, apply each model to the current feature set and get the predicted value. Remove both the highest and the lowest prediction value(s) from the models and calculate the average of the remaining predicted values. Use the trimmed average value for the final prediction value.

Weighted average for regression models: For each instance, apply each model to the current feature set and get the predicted value. Assign a weight to the predicted value based on the evaluation accuracy of the model. The higher the accuracy of the model, the more weight that will be assigned to the predicted value from the model. Then, calculate the average of the weighted predicted values and use the weighted average value for the final prediction value. The weights for different models need to be normalized so that the sum of the weights is equal to 1.

To evaluate an unsupervised learning model, let $f_u$ represents an unsupervised learning model, which is a combination of the unsupervised learning model algorithm and a parameter set. For example, in FIG. 2, one $f_u$ can be a combination of Unsupervised Model 1 and Parameter Set 11. To evaluate how unsupervised learning model $f_u$ performs, example implementations evaluate whether the results from $f_u$ are correct in terms of some predefined metrics, which can come from model-based metrics or business metrics. In the related art, this evaluation is usually performed manually by looking at each individual case and checking whether it is correctly handled by the model based on the business knowledge. Such a manual process is time consuming, prone to errors, inconsistent, and subjective.

Example implementations involve a solution that can efficiently, effectively, and objectively evaluate the unsupervised learning model. The evaluation of unsupervised learning model $f_u$ can be translated into the evaluation of the relationship between features and the results discovered by $f_u$. For this task, we stack a set of supervised learning models by using the Features from Feature Engineering 400 (FIG. 3) as features F, and Results from Unsupervised Learning Models 401 as target T to train the supervised learning models. For the set of supervised learning models, several supervised learning model algorithms that are distinct in nature are chosen manually first, and then several parameter sets are chosen for each supervised learning model algorithm. At the model algorithm level, hyperparameter optimization techniques can determine the best parameter set for each model algorithm.

Let $f_s$ be the best model for each supervised learning model algorithm. Each $f_s$ can be considered an independent evaluator and yields an evaluation score for $f_u$: if $f_s$ discovers the similar relationship as $f_u$ does from F and T, then the evaluation score will be high; otherwise, the score will be low.

For each supervised learning model $f_s$, the model evaluation score of $f_s$ can be used as the evaluation score for unsupervised learning model $f_u$: for each $f_s$, the target T is computed by $f_u$, while the predicted value is computed by $f_s$. The evaluation score for $f_s$, which is computed as closeness between the target and predicted value, is essential to measure the similarity of relationships between F and T that are discovered by unsupervised learning model $f_u$ and supervised learning model $f_s$.

At this point, several supervised learning models $f_s$ are obtained for each unsupervised model $f_u$, and each $f_s$ gives an evaluation score for $f_u$. The scores will be aggregated or ensembled to determine whether the unsupervised learning model $f_u$ is a good model or not.

Since the underlying model algorithms of $f_s$ are diverse and distinct in nature from each other, they may give different scores to $f_u$. There are two cases:

If most of $f_s$ yields a high score to $f_u$, then the relationship between F and T is well-captured by $f_u$, and $f_u$ is considered to be good model.

If most of $f_s$ yields a low score to $f_u$, the relationship between F and T is not well-captured by $f_u$, and $f_u$ is considered to be a bad model.

In other words, if and only if $f_u$ reveals the relationship of F and T to be good, most $f_s$ are able to capture the relationship in a similar way as $f_u$ does, and they can yield a good score to $f_u$. Vice versa, if $f_u$ reveals the relationship of F and T to be bad, most $f_s$ will capture the relationships under F and T badly in different ways, and are not able to capture the relationship in a similar way as $f_u$ does, and most $f_s$ will yield a bad score to $f_u$.

To compare different unsupervised learning models, a single score is computed for each $f_u$ based on the evaluation scores that supervised learning models $f_s$ provide to the unsupervised learning model $f_u$. There are several ways to aggregate the evaluation scores, such as mean, trimmed mean, and majority voting. In majority voting, example implementations count the number of supervised learning models that yield the score higher than S, where Sis a predefined number. For mean, example implementations calculate the average of the evaluation scores from supervised learning models. For trimmed mean, example implementations remove K highest and lowest scores and then calculate the average, where K is a predefined number.

Once the evaluation score for each unsupervised model $f_u$ is obtained, the final unsupervised learning model can be selected. This can be selected by utilizing the global best model, in which the example implementations select the model with the best score across the model algorithms and the parameter sets and use that as the final model. Alternatively, it can be selected by utilizing the local best model, in which the example implementations first select the model with the best score for each model algorithm; then ensemble the models, each from a model algorithm.

For an unsupervised learning model, some basic feature selection techniques are available in related art implementations to select features, which include the technique based on correlation analysis and the technique based on variance of values of a feature. However, in general, because model evaluation of unsupervised learning models is not available, the advanced model-based feature selection techniques cannot be applied to select features for unsupervised learning models.

With the introduction of the solution architecture as shown in FIG. 2 and FIG. 3, an unsupervised learning model can be evaluated, so the model-based feature selection techniques can be applied to select features for unsupervised learning models.

Given the whole set of features, the forward feature selection, backward feature selection, and hybrid feature selection, which are available in supervised learning, can be utilized to select which feature set can provide the best performance by leveraging the solution architecture to evaluate unsupervised models as shown in FIG. 2 and FIG. 3.

To explain the unsupervised learning model, example implementations stack a supervised model onto the unsupervised model: the features of the unsupervised learning model are used as features of the supervised learning model. The result of the unsupervised learning model is used as the target for the supervised model. Then, example implementations use the techniques of the supervised learning model to explain the predictions: feature importance analysis, root cause analysis, and so on.

Feature importance is usually done at the model level. It refers to techniques that assign a score to each input feature based on how useful and relevant they are at predicting a target variable in a supervised learning task (i.e., regression task and classification task). There are approaches to compute feature importance scores. For instance, examples of the feature importance scores include statistical correlation scores, coefficients calculated as part of linear models, scores based on decision trees, and permutation importance scores. Feature importance can provide insight into the dataset and the relative feature importance scores can highlight and identify which features may be most relevant to the target. Such insights can help select features for the model and improve the model: for instance, only the top F features are kept to train the model so as to avoid the noise that are introduced by less important features.

Root cause analysis (RCA), on the other hand, is usually done at instance level, i.e., each prediction can have some root causes. There are two broad families of models for RCA: Deterministic models and Probabilistic models. Deterministic models only handle certainty in the known facts or the inferences expressed in the supervised learning model. Probabilistic models are able to handle this uncertainty in the supervised learning model. Both models can use Logic, Compiled, Classifier or Process Model techniques to derive root causes. For probabilistic models, Bayesian network can also be built to derive root causes. Once root causes are identified, it can help derive recommendations to remediate or avoid the potential problems and risks.

For instance, an unsupervised model such as the "Isolation Forest" model can be utilized to perform anomaly detection on the features data, which are derived from the feature engineering module on the data. The output of the anomaly detection will be anomaly scores for the instances in the features data. A supervised model, such as the "Decision Tree" model can be used to perform regression tasks, where the features for the "Decision Tree" model is the same as the features for the "Isolation Forest", and target for the "Decision Tree" model is the anomaly scores which are output from the "Isolation Forest" model. To explain the decision tree, feature importance can be calculated at the model level, and root cause can be identified at instance level.

To calculate feature importance at model level, one implementation is to calculate the decrease in node impurity weighted by the probability of reaching that node. The node impurity can be measure as a gini index. The node probability can be calculated by the number of samples that reach the node, divided by the total number of samples. The higher the feature importance value, the more important the feature.

To find the root cause of a prediction at instance level, the decision tree can be followed from the tree root to the leaf. In the decision tree, each node is associated with a condition, such as "sensor_1>0.5", where sensor_1 is a feature in the feature data. If the decision tree is followed from the tree root, a list of such conditions is obtained. For instance, ["sensor_1>0.5", "sensor_2<0.8, "sensor_11>0.3" ]. With such sequence of conditions that lead to a prediction, the domain experts can infer what could cause the prediction.

To choose a supervised model for a given unsupervised model, one example implementation is to use a supervised learning model algorithm which is similar in nature to the unsupervised learning model algorithm of interest. Another example implementation is to use a simpler model for the supervised learning model so that the model is easier to be interpreted or explained.

In FIG. 1, the failure detection 110 includes two components Feature Engineering 111 and Failure Detection 112. Feature Engineering 111 processes the raw input data and prepares features that can be used for the subsequent modules. There are three major tasks in the feature engineering module: sensor selection, feature extraction, and feature selection. For the sensor selection, not all the sensors are relevant to failure detection. The sensors can be selected through a manual process based on domain knowledge of data and problems, but this is time consuming, prone to errors, and constrained to the expertise of the domain experts. Alternatively, feature selection techniques can be applied as described above. Each sensor can be regarded as features, and then apply the techniques (forward selection, backward selection, hybrid selection) described above to select sensors.

For feature extraction, several techniques are performed against the sensor data to extract features from time series data. Domain knowledge can be incorporated into this process.

An example technique is moving average. Time series data can change sharply from one time point to the next time point. Such fluctuations make it difficult for model algorithms to learn the patterns in the time series data. One technique is to smooth the time series data before it is consumed by the subsequent models. Smoothing the time series is done through calculating the moving average of time series data. Several approaches exist to calculate the moving average, including Simple Moving Average (SMA), Exponential Moving Average (EMA) and Weighted Moving Average (WMA).

One risk of using moving average is that the actual anomalies or outliers may be removed due to the smoothing of the values. To avoid this, example implementations can place more weight to the current data point. Accordingly, example implementations can use weighted moving average (WMA) and Exponential Moving Average (EMA). In particular, EMA is a moving average that places a greater weight and significance on the most recent data points, and the weight reduces in exponential order to the points prior to the current time point. EMA is a good candidate to be used for the moving average calculation task here. The hyperparameters can be tuned in the WMA and EMA to achieve the best evaluation results from the latter models. Another finding is that the industrial failures usually persist for a short period, and this greatly lowers the risks that the moving average calculation removes the anomalies and outliers.

Another example technique is the derivation of values. Differencing/derivation technique can help stabilize the mean of a time series by removing changes in the level of a time series, and therefore eliminating (or reducing) trend and seasonality. The result signals will be stationary time series whose properties do not depend on the time at which the series is observed. Usually only the stationary signals are useful for modeling. Differencing techniques can be first order differencing/derivation where the change of values is calculated; second order differencing/derivation where the change in the change of values is calculated. In practice, it is not needed to go beyond second-order differences to make the time series data stationary.

Differencing technique can be applied to the time series data in the failure detection task. This is because the signals of seasonality and trend usually do not help with the failure detection task, thus it is safe and beneficial to remove them to only retain the necessary stationary signals. Based on the raw sensor data, the change of sensor values (first order derivation/differencing), and the change in the changes of sensor values (second order derivation/differencing) are calculated as features, in addition to the raw sensor data. Besides, as per the domain knowledge, the change of sensor values presents strong signals to detect failures.

Feature selection involves automatic feature selection techniques that can be applied to select a subset of features which will be used to build the failure detection and prediction models. Feature selection techniques as described above to select features can be utilized.

The failure detection module 112 uses the features prepared by the feature engineering module 111 as the input and applies anomaly detection to detect an anomaly at each data point. Conventionally, several anomaly detection models can be tried and evaluated by manually looking at the results. This method is very time consuming and we may not find the best model. Alternatively, example implementations can use the techniques described herein to automatically select the best failure detection model. The Unsupervised Model xx in FIG. 2 will be anomaly detection models; the Unsupervised Output xx in FIG. 2 will be the anomaly scores; the Supervised Model xx in FIG. 3 will be regression models. With such customization, the techniques described herein can be utilized to automatically select the best failure detection model.

The outcome of the anomaly detection model is an anomaly score that indicates the likelihood or probability of observed data points to be an anomaly. The anomaly score is in the range of [0, 1] and the higher the anomaly score, the higher likelihood or probability for the observed data point to be an anomaly.

Given the current sensor readings, the task of failure prediction 120 is to predict the failures that may happen in the future. Related art approaches assume labelled sensor data and use supervised learning approaches to predict the failure. However, such approaches do not work so well for several reasons. Related art approaches cannot determine the optimal windows to collect features/evidence and failures. Related art approaches cannot identify the right signals that can predict failures. Related art approaches cannot identify patterns from a limited amount of failure data. Since the industrial system usually runs in a normal state and failures are usually rare events, it is difficult to capture the patterns of the limited amounts of the failures and therefore hard to predict such failures. Related art approaches cannot build the correct relationship between normal cases and rare failure events in the temporal order. Related art approaches cannot capture a sequence pattern of the progression of rare failures.

The following example implementations introduce an approach to identify the correct signals for failure prediction within optimal feature windows given the limited amount of failure data in the optimal failure window and the required response time, effectively building the correct relationships between normal cases and rare failures, and the progression of rare failures.

The feature transformer module 121 transforms the features from the feature engineering module 111 and detected failures from failure detection 112 into a format so that the LSTM Auto Encoder 122 and LSTM Failure Prediction module 123 can use the transformed version to make predictions for the failures.

Figure 4:
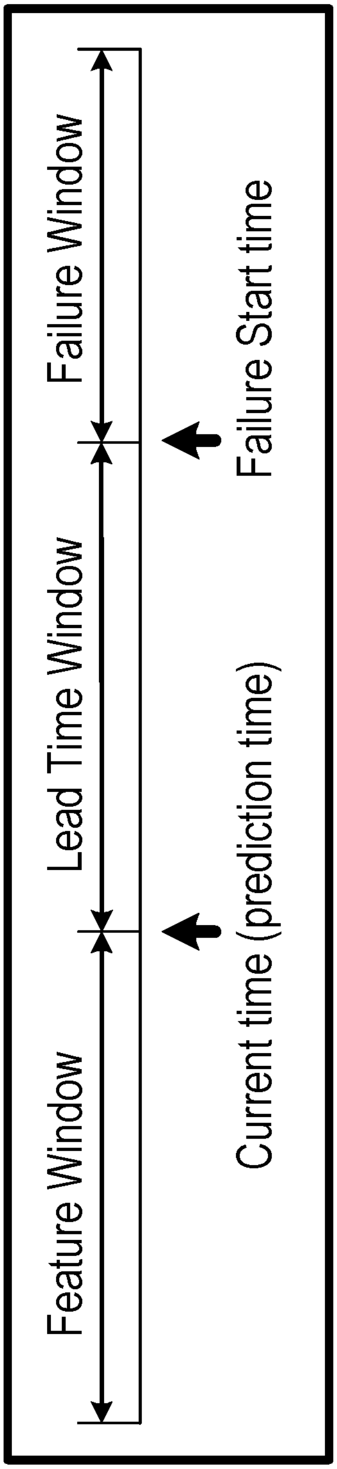
FIG. 4 illustrates an example feature window to extract features and failures, in accordance with an example implementation.

FIG. 4 illustrates an example feature window to extract features and failures, in accordance with an example implementation. To prepare the training data for the latter failure prediction model, example implementations need to prepare both features and target, as required by the supervised learning model. The Feature Window shown in FIG. 4 is a time window from which to retrieve features; the Failure Window is a time window from which to get the target for the failure prediction model (i.e., failures). For failure prediction tasks, there is a need to predict the failure ahead of time so that the operator can have enough time to respond to the potential failures. Lead Time Window is a time window between the current time (also referred to as the "prediction time") and failure start time. It is also called "Response Time Window."

FIG. 4 shows the relationship among the three windows. At current time, the features are collected in the feature window and the failures are collected in the failure window. The end of feature window and the start of failure window are separated by the lead time window.

To extract features for failure prediction, the features in the feature window come from two sources: features from feature engineering 111 and historical failures from failure detection 112. For each time point in the feature window, there are a combination of features from feature engineering 111 and historical failures from failure detection 112. The features and historical failure are all concatenated at all the time points in the feature window into a feature vector.

To extract targets for the failure prediction, the failures in failure window come from two sources: features from feature engineering 111, and historical failures from failure detection 112. For each time point in failure window, there are a combination of features from feature engineering 111 and historical failures from failure detection 112. All the features and historical failures are concatenated at all the time points in the failure window into a target vector.

Note that the LSTM sequence prediction model can predict multiple sequences at the same time. In this model, one type of sequences is failure sequence; the other type of sequences is the feature sequence. Both sequences can be utilized as described herein.

Figure 5:
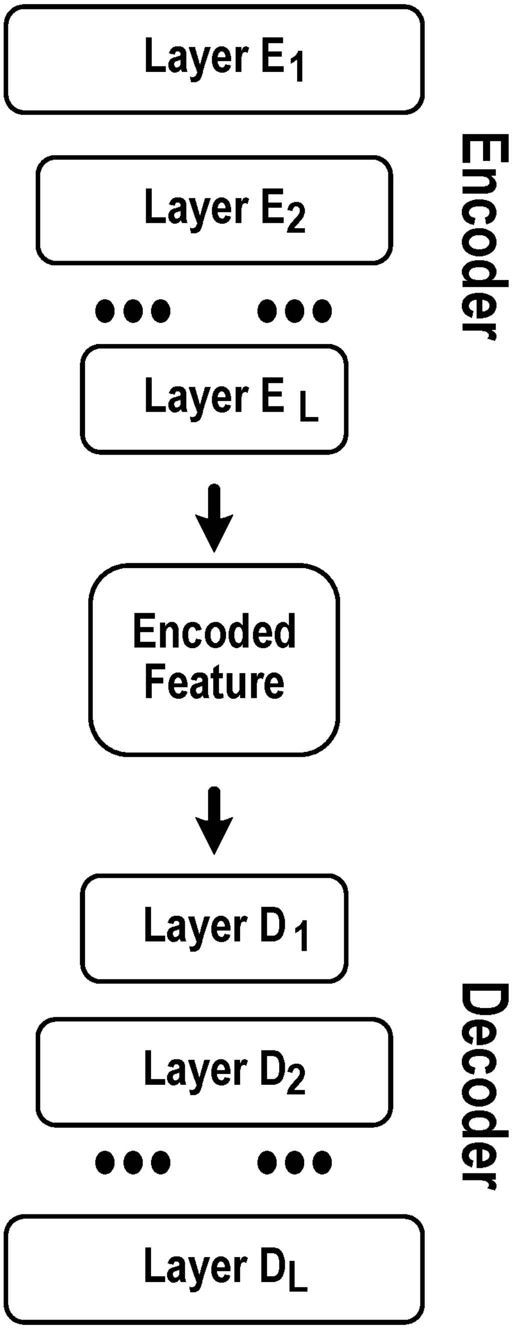
FIG. 5 illustrates a multi-layer Long Short-Term Memory (LSTM) auto encoder, in accordance with an example implementation.

FIG. 5 illustrates a multi-layer LSTM auto encoder, in accordance with an example implementation. Auto encoder is used to encode the derived features from the feature engineering component 111 and historical failures from failure detection component 112 to remove the redundant information in the time series data. The encoded features keep the signals in the time series data and will be used to build failure prediction models.

AutoEncoder is a multilayer neural network and can have two components: encoder and decoder as seen in FIG. 5. To train the following neural network for AutoEncoder, example implementations set Layer $E_1$ to be the same as Layer $D_L$, i.e., the features that need to be encoded. Then, the number of hidden units in each layer of encoder decrease until the number of hidden units becomes the size of encoded feature. Then the number of hidden units in each layer of the Decoder will increase until the number of units becomes the size of the original features. Once the neural network is trained, the encoder component can be used to encode the features.

Figure 6:
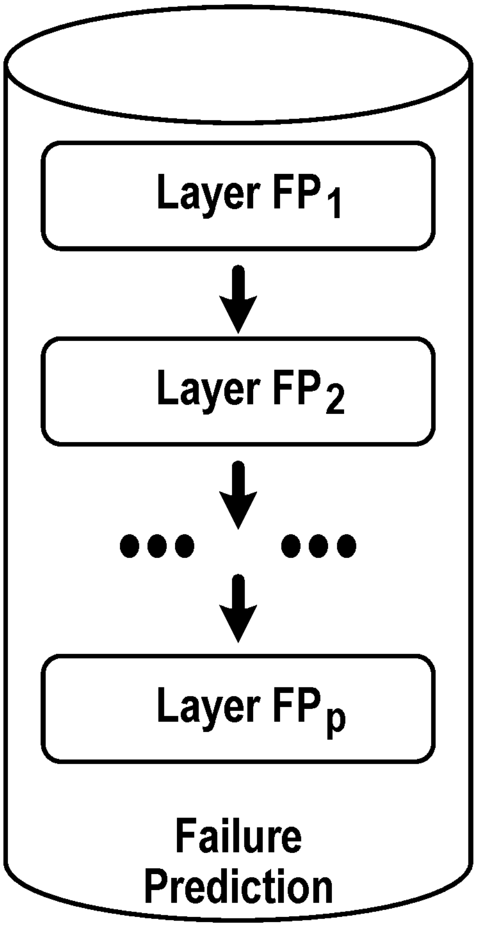
FIG. 6 illustrates a multi-layer LSTM architecture for failure prediction, in accordance with an example implementation.

FIG. 6 illustrates a multi-layer LSTM architecture for failure prediction 123, in accordance with an example implementation. A deep Recurrent Neural Network (RNN) model with LSTM network architecture is used to build a failure prediction model with the encoded features as features, and the original features and detected failures as target. Specifically, FIG. 6 shows the network architecture for the LSTM model where the input layer represent the encoded features; the output layer includes the original features and detected failures, and the hidden layers can be multiple layers, depending on the data.

LSTM model is good for failure prediction in several aspects. First, by incorporating both derived features from sensors and detected historical failure, the LSTM failure prediction model can build the correct relationship between normal cases and rare failure events in the temporal order, and capture the sequence pattern of the progression of rare failures. Second, LSTM is good at capturing the relationship of two events in the time series data, even if the two events are quite apart from each other. This is done through the unique structure of the hidden units which are designed to solve the vanishing gradients problem along the time. As a result, the constraints introduced by "lead time window" can be nicely captured and resolved. Third, LSTM model can output several predictions concurrently, which enables multiple sequence predictions (both sequences of features and sequences of failures) concurrently.

The output of the model includes a continuous failure score, which can avoid the issues caused by rare failures in the system. With a continuous failure score as the target of the model, a regression model can thereby be built. Otherwise, if binary values 0 for normal and 1 are used for failure, there are very few "1"s in the data and such imbalanced data is difficult to train to discover the patterns for failures in a classification problem.

For predicting failures directly, as shown in FIG. 1, one output of the failure prediction module 123 is a failure score which indicates the likelihood of a failure. This failure score is provided as Predicted Failures 124.

Example implementations determine the predicted feature first and then detect failures. As shown in FIG. 1, the other output of the failure prediction module 123 is a set of predicted features 125. The set of predicted features 125 has the same format as the output of the Feature Engineering module 111. The failure detection component can be applied to this set of features to generate a failure score which indicates the likelihood of a failure. This failure score is provided as Detected Failures 126.

Ensemble Failures 127 involve the ensembling of predicted failure 124 and detected failures 126 to form a single failure score. Different ensemble techniques can be used. For example, the average value of predicted failures 124 and detected failures 126 can be used as a single failure score. Other options can be the weighted average, maximum value, or minimum value, depending on the desired implementation.

Example implementations can also be configured to aggregate failures. Since the failure prediction model can predict multiple failures in the failure window, example implementations can aggregate the failures in the failure window to get one single failure score for the whole failure window. The failure score can involve get the simple average, exponential average, weighted average, trimmed average, maximum value, or minimum value of all the failure scores in the failure window and use that as the final failure score.

The reason to use a failure window is that the predicted failure score can change dramatically from one time point to the next time point. Predicting multiple failures within a time window and aggregating them can smooth the prediction score to avoid outlier predictions.

For hyperparameter optimization, example implementations optimize the model hyperparameters. In the AutoEncoder and LSTM Failure model, there are a lot of hyperparameters that need to be optimized. These include, but are not limited to, the number of hidden layers, the number of hidden units in each layer, the learning rate, optimization method, and momentum rate. Several hyperparameter optimization techniques can be applied: grid search, random search, Bayesian optimization, evolvement optimization, and reinforcement learning.

Example implementations can also be configured to optimize the window sizes. For the failure prediction model, there are three windows: feature window, lead time window, and failure window. The size of these windows can also be optimized. Grid search or random search can be applied to optimize these window sizes.

After the failures are predicted, example implementations can identify the root cause(s) of the failures at 131 and recommend remediation actions at 132. Then alerts are generated to notify the operators that failures may happen soon. However, depending on the failure threshold, too many failure alerts may be generated and flood the job queue of the operator, leading to the "alert fatigue" problem. Therefore, suppressing the alert generation at 133 becomes beneficial.

With respect to root cause analysis 131, for each predicted failure, operators need to know what could cause the failure so that they can act to mitigate or avoid the potential failure. Identification of the root cause of predictions corresponds to interpreting the predictions in the machine learning domain, and some techniques and tools exist for such tasks. For instance, explainable AI packages in the related art can help identify the key features that lead to the predictions. The key features can have positive impacts for the predictions and negative impacts for the predictions. Such packages can output top P positive key features and top M negative key features. Such packages can be utilized to identify the root causes of the predicted failures.

Figure 7A:
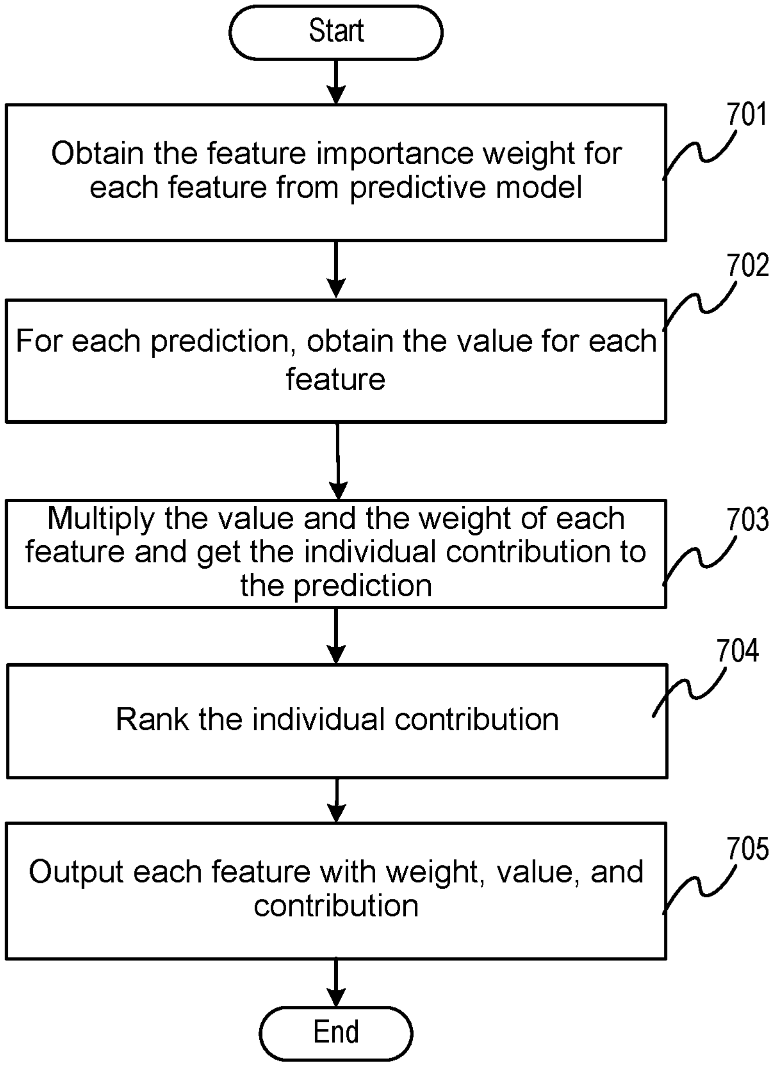
FIG. 7(*a*) illustrates an example for determining features (or leading factors) for the failure prediction, in accordance with an example implementation.
Figure 7B:
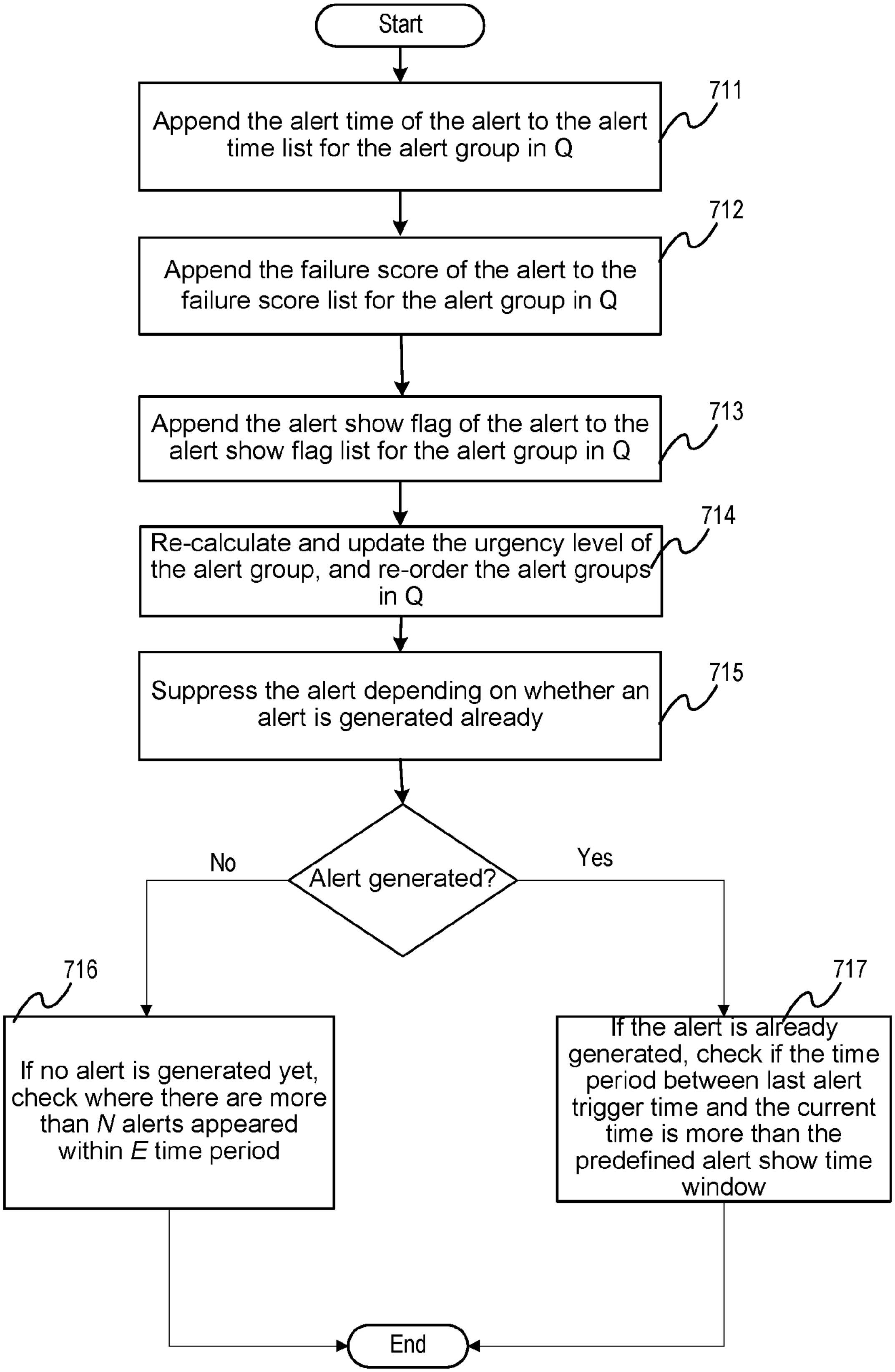
Figure 7C:
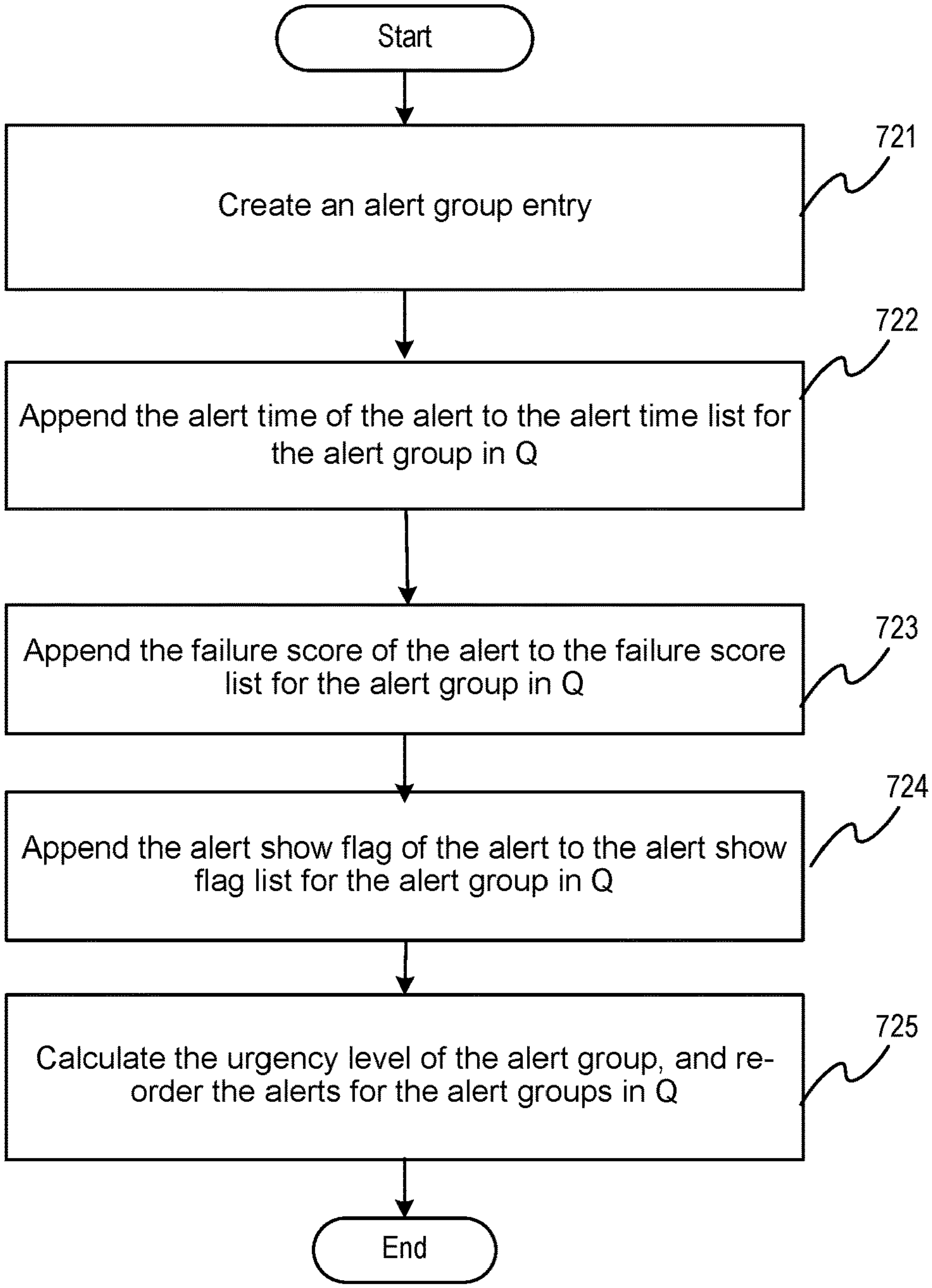

FIG. 7(*a*) illustrates an example for determining features (or leading factors) for the predicted failures, in accordance with an example implementation. To illustrate how Explainable AI works, example implementations utilize the flow of FIG. 7(*a*) introduce a simple approach to discover the key features that lead to the prediction.

At 701, the flow obtains the feature importance weight for each feature from predictive model. At 702, for each prediction, the flow obtains the value for each feature. At 703, the flow multiplies the value and the weight of each feature and get the individual contribution to the prediction. At 704, the flow ranks the individual contribution. At 705, the flow outputs each feature with weight, value, and contribution.

With regards to automating generation of remediation recommendations 132, after the root causes are identified for each prediction, recommend remediation steps are provided to avoid the potential failures. This requires domain knowledge to further cluster the root causes (or symptoms) into failure modes, and based on failure modes, the remediation steps can be generated and recommended to the operators.

The business rules can be automated to cluster the root causes into failure modes and generate remediation recommendations for each failure mode. It is also possible to build machine learning model(s) to help cluster or classify the failures into failure modes by leveraging the business rules.

With regards to alert suppression and prioritization 133, for a predicted failure, an alert may be generated. The alert is represented as a tuple with six elements such as (alert time, asset, failure score, failure mode, remediation recommendations, alert show flag). The alert is uniquely identified by asset and failure mode. Due to the handling cost of each failure, not all the predicted failures should trigger an alert and show to operator. "Alert show flag" indicates whether the alert is generated and showed to customer. Generating the alert at the right time and frequency is critical to remediate the failure and control the alert handling cost. Therefore, example implementations will suppress some alerts in order to control the volume of the alerts and solve the "alert fatigue" problem.

Some alerts may be urgent, and other are not. Alerts therefore need to be prioritized to guide the operators on the urgent alerts first.

In the following, an algorithm is described to optimize the first alert generation with a data driven approach, as well as an approach to suppress and prioritize the alerts.

To optimize the first alert generation, there are three parameters to control when to generate the first alert:

T: The threshold for the predicted failure score. If the predicted failure is larger than the threshold, it is predicted as a failure; otherwise, it is predicted as normal.

N and E: Generate the first alert after N predicted failures appear within time period E.

To optimize these three parameters, the following Cost-Sensitive Optimization algorithm to find the optimal value for T, N and E, as described below.

To formulate the optimization problem, the target function and constraints are defined as follows.

To define the cost, let C be the cost that is incurred by the false predictions. A false prediction can be:

False positive: There is no actual failure, but the model predicts a failure. The cost associated with each false positive instance is called "false positive cost."

False negative: There is an actual failure, but the model predicts no failure. The cost associated with each false negative instance is called "false negative cost."

"False negative cost" is usually larger than "false positive cost," but it depends on the problem to determine how much the "false negative cost" is larger than the "false positive cost." To solve the optimization problem, the "false negative cost" and "false positive cost" are determined from domain knowledge.

Depending on whether to consider the severity or likelihood of the predicted failure, the cost function can be defined for the optimization problem as follows:

Do not consider the severity or likelihood of the predicted failure $C$=number of false positive instances*false positive cost+number of false negative instances*false negative cost Consider the severity or likelihood of the predicted failure $C$=Σ(predicted failure score*false positive cost)+Σ((1−predicted failure score)*false negative cost)

Based on the definition of cost function, the optimization problem can be formulated as follows:

Target Function: Minimize (Cost)

Subject to: $0<T<=T_{max}$, $0<N<=N_{max}$, $0<E<=E_{max}$, where $T_{max}$, $N_{max}$ and $T_{max}$ are predefined based on domain knowledge.

To solve the optimization problem, historical data is utilized from which the number of false positive instances and false negative instances can be counted given the different parameter values of T, N and E. The historical data that is needed for this task includes predicted failure scores and confirmed failures. The confirmed failures usually come from the operators' acknowledgement or rejection of predicted failures.

In case there are no confirmed failures, detected failures can be used by applying a failure detection component to the sensor values. One way to calculate the cost is as follows: for each combination of T, N and E, count the number of false positive instances and number of negative instances and then calculate the cost. The goal is to find the combination of T, N and E which yields the minimal cost. This approach is also called grid search and it can be time consuming to optimize the problem. Other optimization approaches can be used. For example, random search or Bayesian optimization can be applied to solve this problem.

To suppress and prioritize the alerts, given a predicted failure, two decisions need to be made: whether to generate an alert, and the urgency of the alert. In the following, the optimal T, N, E discovered based on historical data are utilized and an algorithm is executed to suppress and prioritize the alerts that will be generated in the industrial systems.

Example implementations maintain a queue, Q, to store the alerts. The alerts can be processed by operators and there are three results for processed alerts: "acknowledged", "rejected" or "resolved"; or the alert may not be processed yet ("unprocessed"). The "resolved" alerts are removed from Q. Depending on the business rules, "rejected" alerts can be retained in Q or be removed from Q.

Each alert can be represented a 6-element tuple. In Q, the alerts with same value of asset and failure mode are aggregated together as an "alert group". For the rest elements in the tuple:

"alert time" is maintained as a list to store all the alert time for each alert group.

"failure score" is maintained as a list to store all the failure scores for each alert group.

"Remediation recommendations" is determined by "asset" and "failure mode", so it has one single value for each alert group.

"alert show flag" is maintained as a list to store all the alert show flags for each alert group.

The alerts can be ordered by their urgency in descending order. The alert urgency can be represented in several levels: low, medium, high. Since the urgency is at the "asset" and "failure mode" level, the urgency level is maintained as a single value for each alert group.

Several factors can be used to determine the urgency level for each alert group, such as importance of the asset, aggregated failure scores, failure mode, remediation time and cost, total number of times that the alerts are generated, number of times that the alerts are generated divided by the time period of first alert and last alert, and so on in accordance with the desired implementation.

By using these factors, a rule-based algorithm can be designed to determine the urgency level of the alert group based on domain knowledge. Alternatively, once the urgency levels for some existing alert groups are known, a supervised learning classification model can be built to predict the urgency level: the features include all the factors that are listed above, and the target is the urgency level. The alert groups in the queue are ordered by urgency level; and the alerts in each alert group are then ordered by the first alert time of the alert.

When there is a new predicted failure, example implementations can get the failure score and failure mode for it. Then, the example implementations check if there is an alert with the same asset and failure mode in Q.

FIG. 7(*b*) illustrates an example flow diagram if there is an alert with the same asset and failure mode, in accordance with an example implementation. At 711, the flow appends the alert time of the alert to the alert time list for the alert group in Q. At 712, the flow appends the failure score of the alert to the failure score list for the alert group in Q. At 713, the flow appends the alert show flag of the alert to the alert show flag list for the alert group in Q. At 714, the flow re-calculates and update the urgency level of the alert group, and re-order the alert groups in Q. At 715, the flow suppresses the alert depending on whether an alert is generated already. Example implementations are aware whether an alert is generated by checking the "alert show flag".

At 716, if no alert is generated yet, the flow checks where there are more than N alerts appeared within E time period (N and F are determined as described above). If the answer is yes, generate the alert; otherwise, do not generate the alert. At 717, if the alert is already generated, the flow checks if the time period between last alert trigger time and the current time is more than the predefined alert show time window. If so, then the flow triggers the alert. The flow sets the last alert trigger time to the current time; otherwise, do not generate the alert. The predefined alert show time window is a parameter that is set by the operators based on the domain knowledge.

FIG. 7(*c*) illustrates an example flow diagram if there is no alert group with the same asset and failure mode, in accordance with an example implementation. At 721, the flow creates an alert group entry: (alert time list, asset, failure score list, failure mode, remediation recommendations, alert show flag list, urgency level), where urgency level is "low" by default. At 722, the flow appends the alert time of the alert to the alert time list for the alert group in Q. At 723, the flow appends the failure score of the alert to the failure score list for the alert group in Q. At 724, the flow appends the alert show flag of the alert to the alert show flag list for the alert group in Q. At 725, the flow calculates and updates the urgency level of the alert group, and re-order the alert groups based on the urgency levels in Q.

If the alert in Q expires, i.e., the alert exists in the alert group for more than the predefined expiration period without any update, it will be removed from the alert group. If no alerts exist for an alert group, the whole alert group will be removed from Q. The predefined expiration period is a parameter that is set by the operators based on the domain knowledge.

The example implementations described herein can be applied to various systems, such as an end-to-end solution. Failure detection, failure prediction, and failure prevention can be provided as a solution suite for industrial failures. This end-to-end solution can be offered as an analytic solution core suite as part of the solution core products. Failure detection can be provided as an analytic solution core as part of the solution core products. It can also be offered as a solution core to automatically label the data. Failure prediction can be provided as an analytic solution core as part of the solution core products. Alert suppression can be provided as an analytic solution core as part of the solution core products. Root cause identification and remediation recommendation can be provided as an analytic solution core as part of the solution core products.

Similarly, example implementations can involve a standalone machine learning library. The framework and solution architecture to solve unsupervised learning tasks with supervised learning techniques can be offered as a standalone machine learning library that help solve unsupervised learning tasks.

Figure 8:
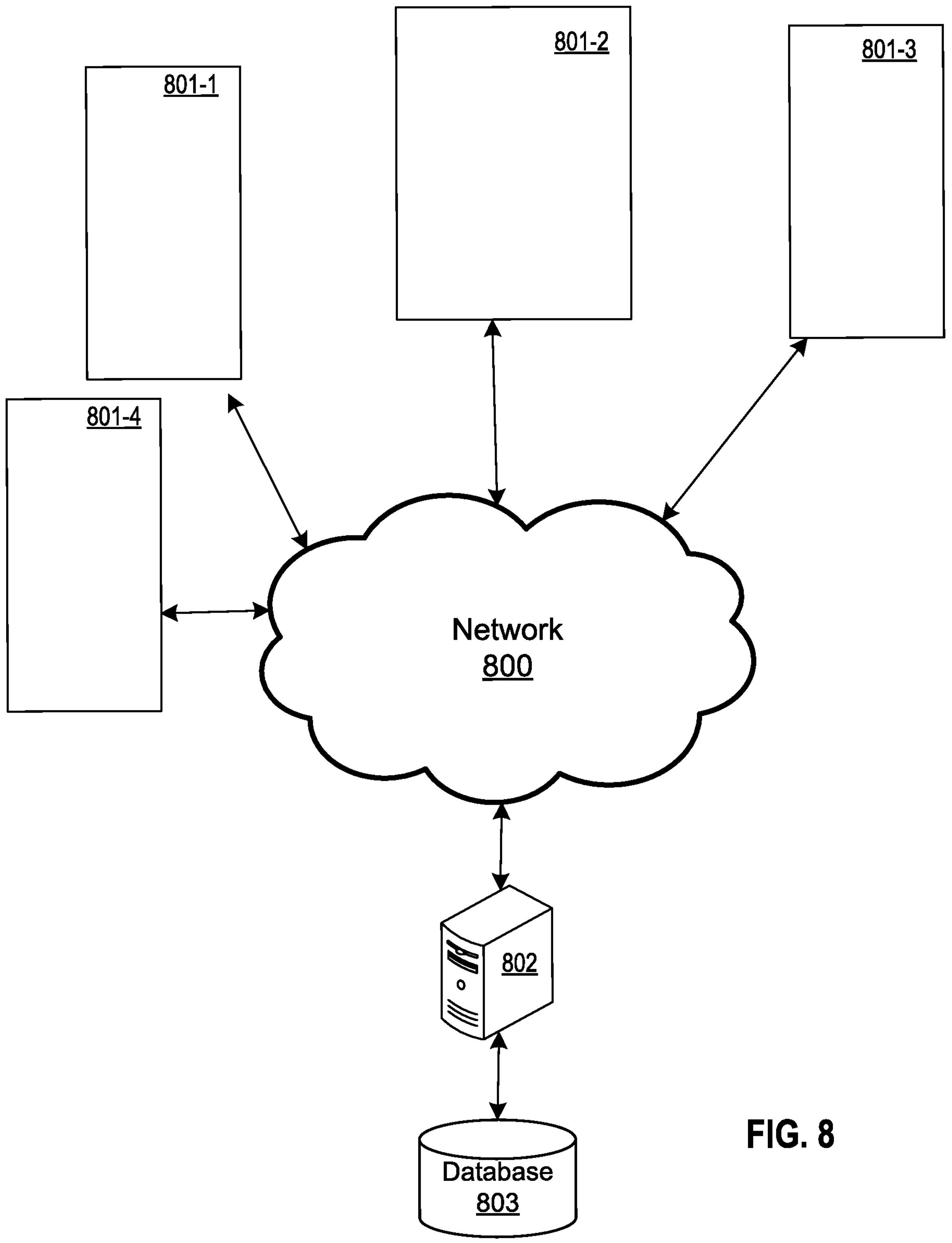
FIG. 8 illustrates a system involving a plurality of systems with connected sensors and a management apparatus, in accordance with an example implementation.

FIG. 8 illustrates a system involving a plurality of systems with connected sensors and a management apparatus, in accordance with an example implementation. One or more systems with connected sensors 801-1, 801-2, 801-3, and 801-4 are communicatively coupled to a network 800 which is connected to a management apparatus 802, which facilitates functionality for an Internet of Things (IoT) gateway or other manufacturing management system. The management apparatus 802 manages a database 803, which contains historical data collected from the sensors of the systems 801-1, 801-2, 801-3, and 8014, which can include labeled data and unlabeled data as received from the systems 801-1, 801-2, 801-3, and 801-4. In alternate example implementations, the data from the sensors of the systems 801-1, 801-2, 801-3, 8014 can be stored to a central repository or central database such as proprietary databases that intake data such as enterprise resource planning systems, and the management apparatus 802 can access or retrieve the data from the central repository or central database. Such systems can include robot arms with sensors, turbines with sensors, lathes with sensors, and so on in accordance with the desired implementation.

Figure 9:
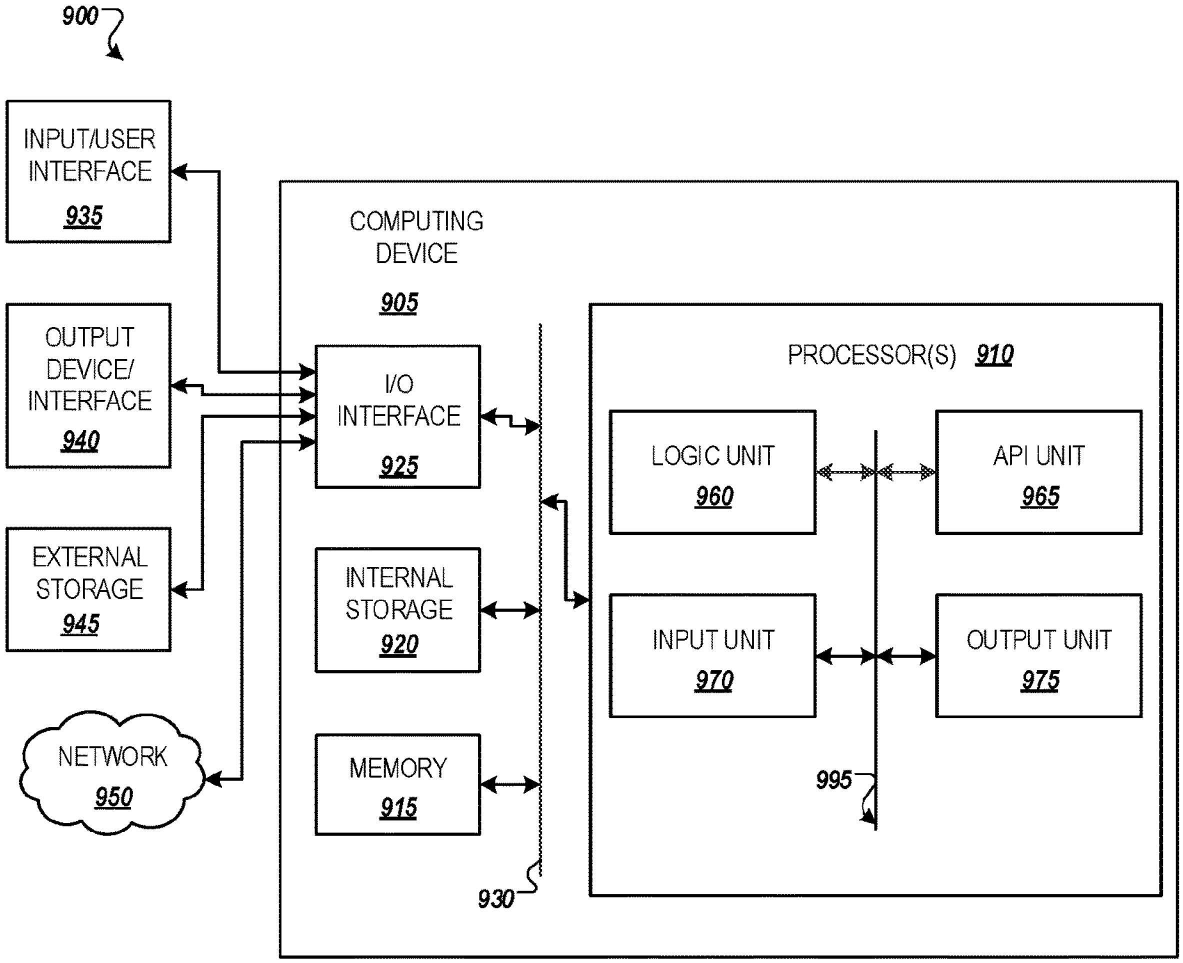
FIG. 9 illustrates an example computing environment with an example computer device suitable for use in some example implementations.

FIG. 9 illustrates an example computing environment with an example computer device suitable for use in some example implementations, such as a management apparatus 802 as illustrated in FIG. 8.

Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

Processor(s) 910 can be configured to execute feature extraction on the unlabeled sensor data to generate a plurality of features as illustrated at 100 and 111 of FIG. 1; execute failure detection by processing the plurality of features with a failure detection model to generate failure detection labels as illustrated at 112 of FIG. 1, the failure detection model generated from a machine learning framework that applies supervised machine learning on unsupervised machine learning models generated from unsupervised machine learning as illustrated in FIG. 2 and FIG. 3; and provide extracted features and the failure detection label to a failure prediction model to generate failure prediction and a sequence of features as illustrated at 123-125 of FIG. 1.

Processor(s) 910 can be configured to generate the failure detection model from applying the supervised machine learning on the unsupervised machine learning models generated from the unsupervised machine learning by executing the unsupervised machine learning to generate the unsupervised machine learning models based on the features; executing supervised machine learning on results from each of the unsupervised machine learning models to generate supervised ensembled machine learning models, each of the supervised ensemble machine learning models corresponding to each of the unsupervised machine learning models; and selecting ones of the unsupervised machine learning models as the failure detection model based on an evaluation of the results of the unsupervised machine learning models against predictions generated by the supervised ensemble machine learning models as illustrated in FIGS. 2 and 3.

Processor(s) 910 can be configured to generate the failure prediction model, the generating the failure prediction model involving extracting features from an optimized feature window from the historical sensor data; determining an optimized failure window and a lead time window based on failures from the historical sensor data; encoding the features with Long Short-Term Memory (LSTM) AutoEncoder; training a LSTM sequence prediction model configured to learn patterns in feature sequences from the feature window to derive failure in the failure window; providing the LSTM sequence prediction model as the failure prediction model; and ensembling failures from detected failures from the failure detection model and predicted failures from the failure prediction model; wherein the failure prediction is ensemble failures from detected failures and predicted failures as illustrated in FIGS. 4 and 5.

Processor(s) 910 can be configured to provide and execute a failure prevention process to determine a root cause of a failure and suppress alerts as illustrated at 130 of FIG. 1, wherein the failure prevention process determines the root cause of the failure and suppress the alerts by identifying the root cause of ensemble failures and automate remediation recommendations to address the ensemble failures; generating alerts from the ensemble failures; executing an alert suppression process with cost-sensitive optimization technique to suppress ones of the alerts based on urgency level; and providing remaining ones of the alerts to one or more operators of the plurality of systems as illustrated at 130-134 of FIG. 1, and as illustrated in FIGS. 7(*b*) and 7(*c*).

Processor(s) 910 can be configured to execute processes to control one or more of the plurality of systems based on the remediation recommendations. As an example, processor(s) 910 can be configured to control one or more of the plurality of systems to shut down, reboot, trigger various and on lights associated with the system, and so on, based on the predicted failure and the recommendation to remediate the failure. Such implementations can be modified based on the underlying system and in accordance with the desired implementation.

Processor(s) 910 can be configured to execute feature extraction on the unlabeled data to generate a plurality of features; and execute a machine learning framework that transforms unsupervised learning tasks into supervised learning tasks through applying supervised machine learning on unsupervised machine learning models generated from unsupervised machine learning, the executing the machine learning framework involving executing the unsupervised machine learning to generate the unsupervised machine learning models based on the features; executing supervised machine learning on results from each of the unsupervised machine learning models to generate supervised ensembled machine learning models, each of the supervised ensemble machine learning models corresponding to each of the unsupervised machine learning models; selecting ones of the unsupervised machine learning models based on an evaluation of the results of the unsupervised machine learning models against predictions generated by the supervised ensemble machine learning models; selecting features based on the evaluation results of the unsupervised learning models; and converting the selected ones of unsupervised learning models to supervised learning models for facilitating explainable artificial intelligence (AI) as illustrated in FIGS. 2, 3, and 7(*a*). Unsupervised learning does not usually have techniques to explain the models. To facilitate explainable AI to explain the unsupervised learning model, example implementations convert the selected ones of unsupervised learning models to supervised learning models so that the features of the unsupervised learning model are used as features of the supervised learning model. The result of the unsupervised learning model is used as the target for the supervised model. Then, example implementations use the techniques of the supervised learning model to explain the predictions to facilitate explainable AI, such as feature importance analysis as illustrated in FIG. 7(*a*), root cause analysis 131, and so on depending on the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a plurality of industrial apparatuses providing unlabeled sensor data, the method comprising:

executing feature extraction on the unlabeled sensor data to generate a plurality of features;

executing failure detection by processing the plurality of features with a failure detection model to generate failure detection labels, the failure detection model generated from a machine learning framework that applies supervised machine learning on unsupervised machine learning models generated from unsupervised machine learning;

providing extracted features and the failure detection label to a failure prediction model, the failure prediction model being a Long Short-Term Memory (LSTM) sequence prediction model that receives the extracted features and the failure detection labels and outputs both a predicted failure score indicating likelihood of failure and a predicted sequence of features having a same format as the extracted features from the feature extraction;

identifying a root cause of ensemble failures and generating automated remediation recommendations to address the ensemble failures;

generating alerts from the ensemble failures;

executing an alert suppression process with cost-sensitive optimization technique to suppress ones of the alerts based on urgency level;

providing remaining ones of the alerts to one or more operators of the plurality of systems; and executing processes to control one or more of the plurality of systems based on the remediation recommendations, wherein the executing processes to control comprises at least one of shutting down, rebooting, or triggering warning indicators on the industrial apparatuses based on the predicted failure and the remediation recommendations.

2. The method of claim 1, wherein the machine learning framework generates the failure detection model from applying the supervised machine learning on the unsupervised machine learning models generated from the unsupervised machine learning by:

executing the unsupervised machine learning to generate the unsupervised machine learning models based on the features;

executing supervised machine learning on results from each of the unsupervised machine learning models to generate supervised ensembled machine learning models, each of the supervised ensemble machine learning models corresponding to each of the unsupervised machine learning models; and selecting ones of the unsupervised machine learning models as the failure detection model based on an evaluation of the results of the unsupervised machine models against predictions generated by the supervised ensemble machine learning models.

3. The method of claim 1, wherein the executing feature extraction comprises applying an Exponential Moving Average (EMA) to smooth time series data from the unlabeled sensor data, wherein the EMA places greater weight on most recent data points with weight reducing in exponential order to prior time points.

4. The method of claim 1, wherein the executing feature extraction comprises applying a differencing technique to the unlabeled sensor data to generate stationary time series signals, the differencing technique comprising calculating at least one of a first order derivation representing change of sensor values or a second order derivation representing change in the change of sensor values.

5. The method of claim 1, wherein the failure detection model comprises an Isolation Forest model configured to perform anomaly detection on the plurality of features, wherein an output of the anomaly detection comprises anomaly scores for instances in the features, the anomaly scores being in a range of [0,1] with higher scores indicating higher likelihood of anomaly.

6. The method of claim 1, wherein the LSTM sequence prediction model receives encoded features from an LSTM, the LSTM comprising an encoder component and a decoder component configured to remove redundant information from time series data while retaining signals for failure prediction.

7. The method of claim 1, further comprising extracting features from a feature window and failures from a failure window, wherein a lead time window separates an end of the feature window from a start of the failure window, the lead time window providing response time for an operator to respond to predicted failures.

8. The method of claim 1, wherein the ensemble failures are generated by ensembling predicted failures from the LSTM sequence prediction model and detected failures from applying the failure detection model to the predicted sequence of features, the ensembling comprising at least one of calculating an average value, a weighted average, a maximum value, or a minimum value of the predicted failures and the detected failures.

9. The method of claim 1, wherein the alert suppression process comprises controlling alert generation based on a threshold T for predicted failure score, a count N of predicted failures, and a time period E, wherein a first alert is generated after N predicted failures appear within time period E and the predicted failure score exceeds threshold T.

10. The method of claim 1, wherein the identifying the root cause comprises applying a supervised decision tree model to outputs of the failure detection model, wherein the decision tree is followed from a tree root to a leaf to obtain a list of conditions associated with features that lead to the predicted failure.

11. The method of claim 1, wherein the cost-sensitive optimization technique comprises minimizing a cost function based on false positive cost associated with predicting a failure when no actual failure exists and false negative cost associated with predicting no failure when an actual failure exists, wherein the false negative cost is larger than the false positive cost.

12. The method of claim 1, further comprising maintaining an alert queue storing alerts, wherein alerts with same asset and failure mode are aggregated into an alert group, and the alert groups are ordered by urgency level in descending order, the urgency level determined based on at least one of importance of asset, aggregated failure scores, failure mode, or remediation time and cost.

13. A method for a system comprising a plurality of apparatuses providing unlabeled sensor data, the method comprising:

executing feature extraction on the unlabeled sensor data to generate a plurality of features;

executing failure detection by processing the plurality of features with a failure detection model to generate failure detection labels, the failure detection model generated from a machine learning framework that applies supervised machine learning on unsupervised machine learning models generated from unsupervised machine learning;

providing extracted features and the failure detection label to a failure prediction model to generate failure prediction and a sequence of features;

identifying a root cause of ensemble failures and generating automated remediation recommendations to address the ensemble failures;

generating alerts from the ensemble failures;

executing an alert suppression process with cost-sensitive optimization technique to suppress ones of the alerts based on urgency level;

providing remaining ones of the alerts to one or more operators of the plurality of systems;

executing processes to control one or more of the plurality of systems based on the remediation recommendations; and generating the failure prediction model, the generating the failure prediction model comprising:

extracting features from an optimized feature window from historical sensor data;

determining an optimized failure window and a lead time window based on failures from the historical sensor data;

encoding the features with Long Short-Term Memory (LSTM);

training a LSTM sequence prediction model configured to learn patterns in feature sequences from the feature window to derive failure in the failure window;

providing die LSTM sequence prediction model as the failure prediction model; and ensembling failures from detected failures from the failure detection model and predicted failures from the failure prediction model; wherein the failure prediction is ensemble failures from detected failures and predicted failures.

14. A method for a system comprising a plurality of industrial apparatuses providing unlabeled data, the method comprising:

executing feature extraction on the unlabeled data to generate a plurality of features;

executing a machine learning framework that transforms unsupervised learning tasks into supervised learning tasks through applying supervised machine learning on unsupervised machine learning models generated from unsupervised machine learning, the executing the machine learning framework comprising:

executing the unsupervised machine learning to generate the unsupervised machine learning models based on the features;

executing supervised machine learning on results from each of the unsupervised machine learning models to generate supervised ensembled machine learning models, each of the supervised ensemble machine learning models corresponding to each of the unsupervised machine learning models;

selecting ones of the unsupervised machine learning models based on an evaluation of the results of the unsupervised machine learning models against predictions by the supervised ensemble machine learning models;

selecting features based on the evaluation results of the unsupervised learning models; and converting the selected ones of unsupervised learning models to supervised learning models for facilitating explainable artificial intelligence (AI);

identifying a root cause of ensemble failures and generating automated remediation recommendations to address the ensemble failures;

generating alerts from the ensemble failures;

executing an alert suppression process with cost-sensitive optimization technique to suppress ones of the alerts based on urgency level;

providing remaining ones of the alerts to one or more operators of the plurality of systems; and executing processes to control one or more of the plurality of systems based on the remediation recommendations, wherein the executing processes to control comprises at least one of shutting down, rebooting, or triggering warning indicators on the industrial apparatuses based on the predicted failure and the remediation recommendations.

15. A non-transitory computer readable medium, storing instructions for management of a system comprising a plurality of industrial apparatuses providing unlabeled sensor data, the instructions comprising:

executing feature extraction on the unlabeled sensor data to generate a plurality of features;

executing failure detection by processing the plurality of features with a failure detection model to generate failure detection labels, the failure detection model generated from a machine learning framework that applies supervised machine learning on unsupervised machine learning models generated from unsupervised machine learning;

providing extracted features and the failure detection label to a failure prediction model, the failure prediction model being a Long Short-Term Memory (LSTM) sequence prediction model that receives the extracted features and the failure detection labels and outputs both a predicted failure score indicating likelihood of failure and a predicted sequence of features having a same format as the extracted features from the feature extraction;

identifying a root cause of ensemble failures and generating automated remediation recommendations to address the ensemble failures;

generating alerts from the ensemble failures;

executing an alert suppression process with cost-sensitive optimization technique to suppress ones of the alerts based on urgency level;

providing remaining ones of the alerts to one or more operators of the plurality of systems; and executing processes to control one or more of the plurality of systems based on the remediation recommendations, wherein the executing processes to control comprises at least one of shutting down, rebooting, or triggering warning indicators on the industrial apparatuses based on the predicted failure and the remediation recommendations.

16. The non-transitory computer readable medium of claim 15, wherein the machine learning framework generates the failure detection model from applying the supervised machine learning on the unsupervised machine learning models generated from the unsupervised machine learning by:

executing the unsupervised machine learning to generate the unsupervised machine learning models based on the features;

executing supervised machine learning on results from each of the unsupervised machine learning models to generate supervised ensembled machine learning models, each of the supervised ensemble machine learning models corresponding to each of the unsupervised machine learning models; and selecting ones of the unsupervised machine learning models as the failure detection model based on an evaluation of the results of the unsupervised machine learning models against predictions generated by the supervised ensemble machine learning models.

17. The non-transitory computer readable medium of claim 15, wherein generating the LSTM sequence prediction model comprises:

extracting features from an optimized feature window from historical sensor data;

determining an optimized failure window and a lead time window based on failures from the historical sensor data;

encoding the features with Long Short-Term Memory (LSTM);

training the LSTM sequence prediction model configured to learn patterns in feature sequences from the feature window to derive failure in the failure window; and providing the LSTM sequence prediction model as the failure prediction model; and ensembling failures from detected failures from the failure detection model and predicted failures from the failure prediction model; wherein the failure prediction is ensemble failures from detected failures and predicted failures.

* * * * *